Sept. 21, 1943.  E. H. TAYLOR  2,329,956

PIPE FITTING

Filed Feb. 13, 1942

INVENTOR.
Edward Hall Taylor
BY
Orwin, Jackson, Burrtedu & Ouaru
Attys.

Patented Sept. 21, 1943

2,329,956

UNITED STATES PATENT OFFICE 2,329,956

PIPE FITTING

Edward Hall Taylor, Chicago, Ill.

Application February 13, 1942, Serial No. 430,728

7 Claims. (Cl. 235—145)

This invention relates to pipe fittings, and has to do more particularly with fittings intended for securing to pipe ends by a metallic bond between the fitting and the pipe end, as by brazing, soldering or welding.

I will hereinafter refer mainly to the fittings of my invention as being for welding to pipe ends, for which they are well suited, in order to simplify the description thereof. It is to be understood, however, that my invention contemplates securing the fitting and the pipe end together by a metallic bond therebetween produced either by welding or in any other suitable manner, and that what is said with respect to welding the fitting to a pipe end applies, in its broader aspects, to other methods of securing these members together by a metallic bond therebetween.

In welding fittings of ordinary type to pipe ends considerable difficulty and delay frequently is encountered in properly positioning the end of the fitting relative to the pipe end and in maintaining that relation during the welding operation. My invention is directed primarily to the provision of a fitting having means whereby the end of the fitting and the pipe end may be accurately positioned with expedition and facility in proper relation for welding together thereof, such means serving effectively to maintain that relation during the welding operation. More specifically, I provide a fitting having an end portion of a slightly greater interior diameter than the exterior diameter of the pipe end, this end portion of the fitting being provided interiorly with projections of a character to grip the pipe end, upon insertion of the latter into the end of the fitting, thereby effectively securing the pipe end and the fitting in proper relation for welding. The elements for gripping the pipe end may, within the broader aspects of my invention, assume various forms. They may, for example, be in the form of helical elements of certain type and arrangement providing teeth of a character readily to bite into and grip the pipe end; in the form of unserrated inwardly projecting resilient elements capable of being sprung or forced outward to a certain extent by the act of forcing the pipe end into the fitting, and exerting a strong spring pressure effective for tightly gripping and retaining the pipe end; or in the form of serrated inwardly projecting resilient elements the spring pressure of which augments the effect of the teeth for gripping the pipe end. Further objects and advantages will appear from the detail description.

In the drawing—

Figure 1:
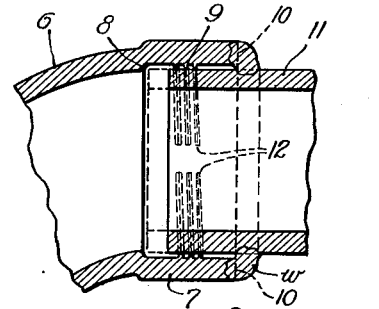
Figure 1 is a central vertical lengthwise section through a fitting embodying my invention and an associated pipe end secured therein preparatory to welding the fitting to the pipe end, the fitting and the pipe end being shown fragmentarily, this view being taken substantially on line 1—1 of Figure 2.
Figure 2:
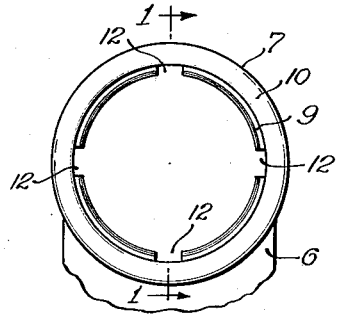
Figure 2 is an end view of the fitting of Figure 1, looking at the end thereof intended for reception of the pipe end to be welded thereto, a portion of the fitting being broken away.

I have illustrated my invention, by way of example, as applied to a fitting 6 in the form of a bend, such as an elbow, provided at one end with a lengthwise straight end portion or bell 7 of increased diameter, providing a shoulder 8 between the body of fitting 6 and bell 7. End portion 7 of fitting 6 is provided with interior helical elements, providing teeth 9 which decrease in height toward the annular end surface 10 of end portion 7, this surface 10 being intended for welding to a pipe end 11 inserted into the end portion of fitting 6.

It will be noted that the interior diameter of end portion 7 of fitting 6 is slightly greater than the exterior diameter of the pipe end 11. Further, the outermost tooth 9, which is the shortest, is of such height that the opening defined by that tooth or element is but slightly less than the exterior diameter of pipe end 11, and exerts a slight gripping effect thereon without biting into the pipe end to any considerable extent. The teeth 9, decreasing in height outward, define in effect an inwardly tapering opening which, in conjunction with the unthreaded length of portion 7 extending outward beyond teeth 9, facilitates insertion of pipe end 11 into end portion 7 of fitting 6 and centering of the pipe end relative thereto.

Preferably, the pipe end is moved lengthwise into end portion 7 of fitting 6 until it is disposed within and centered by the outermost tooth 9 and, if desired, the central tooth, these teeth or elements being slightly sprung or distorted by forcing the pipe end into the fitting. The pipe is then rotated so as to be turned into the fitting, the teeth 9 cutting into the pipe end in the rotation of the latter to a slight extent, sufficient to grip it firmly. In that connection, it will be noted that the elements 9 of the fitting are mutilated or interrupted by channels 12 therethrough. That is advantageous in that it renders elements 9 self-tapping, which facilitates turning of the pipe end into the fitting. A further advantage is that the channels 12 provide passages for flow of solder or other metallic substances between the pipe end and the fitting, when it is desired to secure them together by soldering or brazing. In that manner the pipe end is effectively secured in end portion 7 of the fitting, as shown in Figure 1, after which the annular end surface 10 of the fitting is joined to pipe end 11 by welding, as shown at $w$, or the pipe end and the fitting may be secured together by soldering or brazing, as circumstances may require.

Normally, it is sufficient to turn the pipe end into the fitting to such an extent that all of the elements or teeth 9 grip the pipe end, as shown in Figure 1, although the pipe end may be turned into the fitting to a greater extent if desired. The shoulder 8 provides a stop for limiting movement of the pipe end into the fitting, as will be clear from Figure 1, in which the pipe end is indicated, in dotted lines, as turned into the fitting to such an extent as to contact shoulder 8. By constructing the end portion of the fitting in the manner shown and described, I render it possible to center the pipe end relative to the end of the fitting with expedition and facility, and also assure that the pipe end and the end of the fitting are securely held together and will be maintained in proper centered relation during the operation of securing them together by a metallic bond, as by welding.

Figure 3:
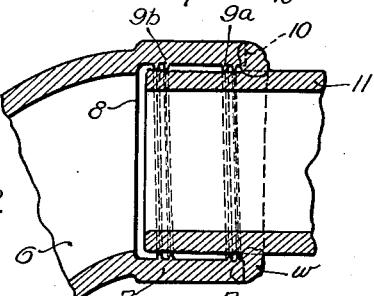
Figure 3 is a view similar to Figure 1, taken substantially on line 3—3 of Figure 4, showing a fitting embodying a modified form of my invention.
Figure 4:
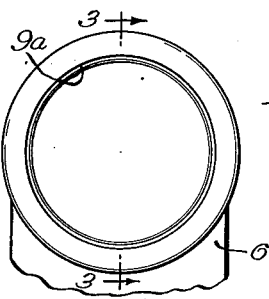
Figure 4 is a view similar to Figure 2, of the fitting of Figure 3.

In the modified form of fitting shown in Figures 3 and 4, the enlarged end portion thereof is provided interiorly, for a short distance as its outer end and adjacent shoulder 8, with an outer set of uninterrupted helical elements or teeth 9$^a$ and an inner set of uninterrupted helical elements or teeth 9$^b$. Each set comprises two teeth, of which the outer one is the shorter, and the area of the inner surface of portion 7 of fitting 6 between these two sets of teeth is smooth and unserrated. The pipe end is inserted into the end of the fitting and turned thereinto, as before. The elements or teeth 9$^a$ of the outer set first grip the pipe end and cut slightly thereinto during rotation thereof. When the pipe end has been turned sufficiently far into the fitting, the elements or teeth 9$^b$ of the inner set engage the pipe end, turning of the pipe continuing until the end thereof is engaged by all of the teeth 9$^b$ or, if desired, until the end of the pipe abuts shoulder 8. The pipe end is thus effectively gripped and secured at two areas spaced a material distance apart lengthwise thereof. That is of advantage, particularly if the pipe be of considerable length, as providing additional assurance that the fitting and the pipe end will be maintained in proper relation one to the other during the operation of securing them together.

Figure 5:
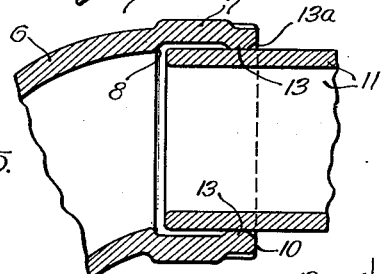
Figure 5 is a view similar to Figure 1, taken substantially on line 5—5 of Figure 6, showing a fitting embodying a second modified form of my invention.
Figure 6:
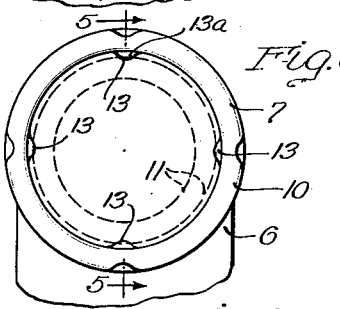
Figure 6 is a view similar to Figure 2, of the fitting of Figure 5.

The fitting shown in Figures 5 and 6 is provided, at the outer end of the straight enlarged portion 7 thereof, with inwardly projecting elements 13 in the general form of rounded bumps or beads. Elements 13 are formed by forcing inward selected areas of the wall of portion 7, in any suitable known manner, are rounded circumferentially of portion 7 and have their inner portions rounded, but the outer portions of elements 13 preferably are flat, presenting straight surfaces 13$^a$ converging inward of the fitting end. The inner surfaces of elements 13, radially of portion 7 of fitting 6, are spaced apart a distance somewhat less than the exterior diameter of pipe 11, indicated in dotted lines in Figure 6. The surfaces 13$^a$ of elements 13 assist in guiding the pipe end and centering it relative to the fitting during its insertion, in an obvious manner. The pipe end is inserted into the fitting so as to extend thereinto beyond the elements 13. That forces elements 13 outward from their normal positions, in opposition to the contiguous portions of the wall of portion 7 of the fitting. Elements 13 are thus sprung outward and grip the pipe end under considerable spring pressure, effective for holding the fitting and the pipe end in proper relation one to the other during the operation of securing them together. If the fitting 6 is formed of wrought steel for welding, for example, the elements 13 will exert a powerful spring grip on the pipe end. In any case, however, the elements 13 are so disposed, with due regard for the characteristics of the fitting and of the pipe end, as to assure that the pipe end will be effectively gripped and held during the operation of securing it to the fitting by a metallic bond therebetween.

A further advantage of the fitting shown in Figures 5 and 6 resides in the fact that the elements 13 are capable of accommodating, within limits, misalignment of the fitting and the pipe end, which, at times, may be unavoidable. While the elements 13 have been shown as of approximately hemi-spherical shape, which is suitable for many purposes, they may be of various shapes within the broader aspects of my invention. For example, elements 13 may be more or less elongated either circumferentially or lengthwise of portion 7 of fitting 6 and, if desired, may be spaced from the outer end of portion 7. Also, if desired, elements 13 may be provided with helical elements or teeth, or analogous members for biting into and gripping the pipe end. Since elements 13 are spaced apart, passages are provided therebetween for flow of a metallic substance between the fitting and the pipe end for securing them together by brazing or soldering.

Figure 7:
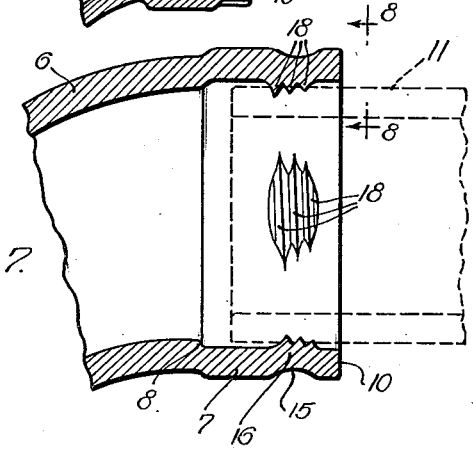
Figure 7 is a fragmentary lengthwise sectional view through a fitting embodying a third modified form of my invention.
Figure 8:
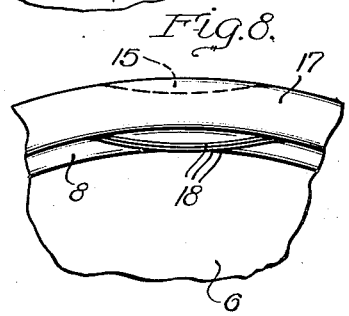
Figure 8 is a fragmentary end view of the fitting of Figure 7, on an enlarged scale, taken substantially on line 8—8 of Figure 7.

In Figures 7 and 8 straight end portion 7 of fitting 6 is provided with circumferentially spaced indentations 15, of arcuate shape lengthwise of portion 7 as well as circumferentially thereof. That provides gripping elements 16 projecting inward radially of end portion 13 and spaced a material distance from the annular end surface 10 of that portion of the fitting. The elements 16 decrease in height toward the end surface 10 of portion 7 and provide, in effect, spring elements which may be forced or sprung outward by forcing the pipe end 11 endwise into portion 7 of fitting 6. Since the elements 16 decrease in height toward end surface 10, they cooperate with the length of portion 7 extending outward beyond elements 16 for centering the pipe end relative to the end of the fitting. The elements 16 are provided at their inner faces with serrations or teeth of a character to bite into and grip the pipe end. For that purpose, each of the gripping elements 16 is provided, at its inner surface, with helical elements providing teeth 18 decreasing in height toward end surface 10. The pipe end is inserted into end portion 7 of the fitting 6 sufficiently to tend to spring the gripping elements 16 outward to a certain extent, causing the teeth 18 to grip tightly the pipe end, after which the pipe is turned into the fitting, the end welding surface 10 of the fitting being then welded to the pipe end. If desired, the fitting and the pipe end may be secured together by soldering or brazing, the spacing of elements 16 providing passages for flow between them of the metallic substance used.

As above indicated, changes in construction and arrangement of parts of my invention may be resorted to without departing from the field and scope thereof, and I intend to include all such variations, as fall within the scope of the appended claims, in this application in which the preferred forms only of my invention are disclosed.

I claim:

1. As a new article of manufacture, a fitting for securing to an unthreaded pipe end by a metallic bond between the two, said fitting having an end portion the interior diameter of which is slightly greater than the exterior diameter of the pipe end for reception of the latter, said end portion of said fitting being provided with inwardly projecting helical elements providing teeth decreasing in height toward the outer end of said end portion and disposed for gripping engagement with the pipe end upon insertion of the latter into said end portion of said fitting between said elements, said teeth being spaced inward an appreciable distance from the end of said fitting providing an unobstructed space about the inserted pipe end for free flow of metal between the pipe end and the end portion of said fitting extending outward beyond said teeth for securing said pipe end and said fitting together by a metallic bond therebetween.

2. As a new article of manufacture, a fitting for securing to an unthreaded pipe end by a metallic bond between the two, said fitting having an end portion the interior diameter of which is slightly greater than the exterior diameter of the pipe end for reception of the latter, said end portion of said fitting being provided with circumferentially spaced inwardly pressed areas disposed nonhelically thereabout and substantially in a common plane perpendicular to the axis of said end portion of said fitting, said areas providing inwardly projecting elements adapted for gripping engagement with the pipe end upon insertion of the latter into said end portion of said fitting between said elements.

3. As a new article of manufacture, a fitting for securing to an unthreaded pipe end by a metallic bond between the two, said fitting having an end portion the interior diameter of which is slightly greater than the exterior diameter of the pipe end for reception of the latter, said end portion of said fitting being provided with circumferentially spaced inwardly pressed areas disposed nonhelically thereabout and substantially in a common plane perpendicular to the axis of said end portion of said fitting, said areas providing inwardly projecting elements of generally rounded contour having their outer faces lengthwise of said portion flat and converging inward of the latter, said elements being disposed and adapted for gripping engagement with the pipe end upon insertion of the latter into said end portion of said fitting between said elements.

4. As a new article of manufacture, a fitting for securing to a pipe end by a metallic bond between the two, said fitting having an end portion the interior diameter of which is slightly greater than the exterior diameter of the pipe end for reception of the latter, said end portion of said fitting being provided with circumferentially spaced inwardly pressed areas providing inwardly projecting resilient gripping elements spaced a material distance away from the outer end of said end portion, said gripping elements having helical elements on their inner surfaces providing teeth decreasing in height toward said outer end and disposed for gripping engagement with the pipe end upon insertion of the latter into said end portion of said fitting between said gripping elements.

5. As a new article of manufacture, a fitting for securing to a pipe end by a metallic bond between the two, said fitting having an end portion the interior diameter of which is slightly greater than the exterior diameter of the pipe end for reception of the latter, said end portion of said fitting being provided with circumferentially spaced inwardly pressed areas providing inwardly projecting gripping elements, said gripping elements having helical elements on their inner surfaces providing teeth decreasing in height toward the outer end of said fitting and disposed for gripping engagement with the pipe end upon insertion of the latter into said end portion of said fitting between said gripping elements.

6. As a new article of manufacture, a fitting for securing to a pipe end by a metallic bond between the two, said fitting having an end portion the interior diameter of which is slightly greater than the exterior diameter of the pipe end for reception of the latter, said end portion of said fitting being provided with circumferentially spaced inwardly pressed areas providing inwardly projecting gripping elements, said gripping elements having elements on their inner surfaces providing teeth disposed for gripping engagement with the pipe end upon insertion of the latter into said end portion of said fitting between said gripping elements.

7. As a new article of manufacture, a fitting for securing to a pipe end by a metallic bond between the two, said fitting having an end portion the interior diameter of which is slightly greater than the exterior diameter of the pipe end for reception of the latter, said end portion of said fitting being provided with areas spaced apart circumferentially thereof and having elements on their inner surfaces providing teeth disposed for gripping engagement with the pipe end upon insertion of the latter into said end portion of said fitting between said areas, the latter being spaced inward an appreciable distance from the end of said fitting providing an unobstructed space about the inserted pipe end for free flow of metal between the pipe end and the end portion of said fitting extending outward beyond said areas for securing said pipe end and said fitting together by a metallic bond therebetween.

EDWARD HALL TAYLOR.